United States Patent Office 3,145,208
Patented Aug. 18, 1964

3,145,208
MANUFACTURE OF HERBICIDAL DERIVATIVES OF 2-MERCAPTO-4,6-BIS-AMINO-s-TRIAZINE
Enrico Knüsli, Riehen, near Basel, Wilfried Schäppi, Basel-Land, and Dagmar Berrer, Riehen, near Basel, Switzerland, assignors to J. R. Geigy A.-G., Basel, Switzerland
No Drawing. Filed July 5, 1963, Ser. No. 293,201
Claims priority, application Switzerland Nov. 20, 1961
6 Claims. (Cl. 260—249.8)

This application is a continuation-in-part of our co-pending application Serial No. 238,724, filed November 19, 1962 (abandoned since the filing of the present application).

The present invention deals with improvements in and relating to the manufacture of herbicidal derivatives of 2-mercapto-4,6-bis-amino-s-triazine.

Among herbicidal derivatives of this compound are meant such compounds which are obtained by transformation of the HS-group into other groups for instance by alkylation into the corresponding alkylthio-group, especially the methylthio compounds. One or both amino groups of the 2-mercapto-4,6-bis-amino-s-triazine and its herbicidal derivatives are preferably substituted by at least one organic radical.

Some chloropyrimidines are known to react with thiourea in boiling alcohol giving good yields of the corresponding thiols. Also, polysubstituted chloropyrimidines have been reacted with thiourea. Moreover, cyanuric chloride has been reacted at room temperature with thiourea to form triazine-tri-isothiuronium chloride.

All of these known reactions were carried out in alcohol, acetone or similar purely organic media.

It is also known that the single chlorine atoms in cyanuric chloride possess differing grades of mobility; whereas the first chlorine atom reacts with an alkylamine under normal conditions even in the cold, the reaction of the second chlorine atom requires a temperature between 20 and 40° C. and the third chlorine atom reacts only at increased temperatures.

In conformity herewith, it is further known that the reaction of 2-chloro-4,6-bis-amino-s-triazine and of its derivatives alkylated in the amino groups, with alkali hydrosulfide to the corresponding 2-mercapto-4,6-bis-amino-s-triazines, must be carried out at an increased temperature and under pressure. (J. Pr. Ch. (2), 33, 297 (1886); German Patent 1,020,982). The yields obtained in this process are in many cases unsatisfactory and the necessity of working under increased pressure with the highly corrosive alkali hydrosulfide solutions presents difficulties in the manufacturing technique.

Furthermore, the use of such organic solvents, as particularly acetone, on an industrial scale, involves the drawback of representing a considerable danger of fire and poisoning by, for instance, acetone vapors.

It is, therefore, an object of the invention to provide a process for the production of 2-mercapto-4,6-bis-amino-s-triazines which is free from the above-described drawbacks and affords the said end products in good yields.

The process according to the invention by which the aforesaid and other subsequently apparent objects are attained, consists in replacing the halogen atom of 2-halogeno-4,6-bis-amino-s-triazines, preferably substituted in at least one amino group by at least one organic radical, by the HS-group and in transforming the 2-mercapto-compound so obtained into herbicidally active derivatives, e.g. into the corresponding alkylthio-compound, e.g. by reaction with dimethylsulfate. More specifically, the present invention concerns in this process the step of replacing the halogen atom of the 2-halogeno-4,6-bis-amino-s-triazines preferably substituted in at least one amino group, by the HS-group which step consists in reacting the 2-halogeno-compound in an aqueous, preferably an aqueous acid medium with thiourea and saponifying the reaction product in an alkaline medium to give the corresponding 2-mercapto-4,6-bis-amino-s-triazine.

The known methods did not reveal at all the fact that the little active chlorine atom of 2-chloro-4,6-bis-amino-s-triazines can be replaced by a linkage to sulfur by using thiourea in an aqueous, preferably acid medium and under considerably milder conditions than those required for the reaction with alkali hydrosulfide.

The successful replacement of chlorine in 2-chloro-4,6-bis-amino-s-triazines in such a medium and under such conditions by reaction with thiourea could not be foreseen in view of the very low solubility of the starting materials in the reaction medium.

In particular in a medium consisting of water alone, no reaction at all would have been expected while in an acid medium, hydrolysis of the halogenated triazines and formation of the corresponding hydroxy-triazines would have been expected prior to the reaction with thiourea or after formation of the thiouronium salt intermediate.

Important advantages in the process according to the invention result from the use of water and preferably aqueous mineral acid as solvent or diluent.

Thus, when dilute mineral acids, in particular dilute hydrochloric acid, are used, almost analytically pure final products are obtained.

Moreover, the poisonous vapors of highly volatile organic solvents such as acetone, and the inherent danger of fire or explosions is avoided. The replacement of inorganic solvents by water as the reaction medium also renders the process according to the invention much more economical.

Fluorine, chlorine or bromine, particularly chlorine, are suitable as halogen substituents in the 2-halogeno-4,6-bis-amino-s-triazines, which are used as starting materials in the process according to the invention. Organic radicals which are preferably present as substituents of the amino groups of the starting materials and of the 2-mercapto-4,6-bis-amino-s-triazine derivatives produced according to the invention are aliphatic hydrocarbon radicals having a carbon chain which is straight chained, branched or interrupted by oxygen or sulfur atoms, furthermore carbocyclic and aralkyl radicals, five- and six-membered heterocyclic radicals, alicyclic radicals which may contain oxygen or sulfur, and also carboxymethyl- and carbalkoxymethyl radicals.

Among the aliphatic hydrocarbon radicals which may be present as substituents of the amino groups, the following may be mentioned: the methyl, ethyl, n-propyl, isopropyl, butyl, isobutyl, tert.butyl, amyl, isoamyl, allyl and methallyl radical. The following radicals are examples of aliphatic hydrocarbon radicals the chains of which are interrupted by oxygen or sulfur: the methoxymethyl, 2-methoxyethyl, 3-methoxypropyl, 2-methoxypropyl, ethoxymethyl, 2-ethoxyethyl, 2-ethoxypropyl, 3-ethoxypropyl, n- or iso-propoxymethyl, 2-propoxyethyl, 2-allyloxyethyl, 2 - methallyloxyethyl, methoxyethoxyethyl, ethoxyethoxyethyl, methylmercaptomethyl, 2-methylmercaptoethyl, 2-methylmercaptopropyl, 3-methylmercaptopropyl, ethylmercaptomethyl, 2-ethylmercaptoethyl, 2-ethylmercaptopropyl, 3-ethylmercaptopropyl, n- or iso-propylmercaptomethyl, 1-propylmercaptoethyl, 2- or 3-propylmercapto-n-propyl, 2- or 3-isopropylmercaptopropyl, 2-allylmercaptoethyl or the methallylmercaptoethyl radical.

Also hydroxyalkyl radicals such as the hydroxymethyl, 2-hydroxyethyl, 3-hydroxypropyl or the 2-, 3- or 4-hydroxybutyl radical, and alkanoyl radicals such as, e.g. the formyl, acetyl, propionyl, butyryl, isobutyryl and crotonyl radicals are used as aliphatic hydrocarbon radicals.

As possible substituents of the amino groups may further be mentioned the following radicals: phenyl, naphthyl, benzyl, furyl, pyridyl, cyclopentyl and cyclohexyl, as well as the radicals —CH$_2$COOH, —CH$_2$COOCH$_3$, —CH$_2$COOC$_2$H$_5$, etc.

In a preferred mode of carrying out the process according to the invention, a 2-chloro-4,6-bis-amino-s-triazine of the formula

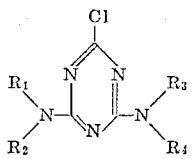

wherein R$_1$ represents alkyl or alkoxyalkyl, and each of R$_2$, R$_3$ and R$_4$, taken independently of each other, represents hydrogen, alkyl or alkoxyalkyl, is reacted with thiourea in an aqueous mineral acid medium, in particular in aqueous hydrochloric acid, having a content of about 10% to 30% by volume at room temperature, and then saponified as described above to obtain the corresponding 2-mercapto derivative.

Compared with the previously known processes, the process according to the invention has considerable and evident advantages both with regard to the purity and yields attained as well as less technical difficulties in the production of the 2-mercapto-4,6-bis-amino-s-triazine derivatives defined above. As has been mentioned above, on using dilute aqueous mineral acid, particularly on using hydrochloric acid, almost analytically pure products are obtained in substantially theoretical yields. Another advantage of the process according to the invention is that an alkaline solution of the desired compounds is obtained which, because of the absence of undesirable by-products and impurities, can be further worked up direct without further purification or even intermediate isolation. The products obtained by the process according to the invention are suitable as intermediate products, particularly for the production of pharmaceuticals and herbicides, by well-known methods.

The present invention is illustrated by the following examples. Parts are given therein as parts by weight and the temperatures are in degrees centigrade.

*Example 1*

201.5 parts (=1 mol) of 2-chloro-4,6-bis-ethylamino-s-triazine are added to a solution of 80 parts (=1.05 mol) of thiourea in 500 parts of 4N-sulfuric acid—i.e. 19.6 percent—mixed with stirring at 20° C. The reaction is completed after 4 hours. 2N-NaOH is then added to the resulting reaction mixture until a pH of 9 to 10 is attained, whereupon the whole is then heated in a water bath to about 60–65° C. for about 15 minutes while stirring continuously. It is then filtered hot, and the filtrate is then cooled and neutralized with 4-normal hydrochloric acid. The voluminous precipitate of the crude final products is filtered off under suction, washed free of chlorine ions with water and dried at 90–100°. The yield is 80% of the theoretical and higher. The melting or decomposition point of the crude 2-mercapto-4,6-bis-ethylamino-s-triazine is about 260°. It rises to 270° by recrystallization from ethyl Cellosolve.

*Example 2*

500 parts by volume of aqueous hydrochloric acid of 15% by volume—i.e. 4.1N—are put into a 2000 ccm. beaker fitted with a thermometer and stirrer and 80 parts of thiourea are dissolved therein while stirring at 15–20°. 229.5 parts of 2-chloro-4,6-bis-isopropylamino-s-triazine are then added within 20 minutes. The first half dissolves well, the second, however, more slowly. After about 30 minutes, a slurry is formed which is kept stirrable by the addition of 200 parts by volume of cold water. The reaction is completed after 5 hours. A sample, diluted with a little water, dissolves in sodium hydroxide solution with only slight turbidity (1150 parts by volume). 217 parts of 30–33% solution of sodium hydroxide are put into a 3000 ccm. beaker and the contents of the first beaker are poured in within 10 minutes at 20° while stirring well. The temperature rises to 45° and a thinly liquid suspension is obtained which dissolves on warming to 70°. A slight turbidity is removed by clarifying by the addition of 5 parts by Hyflo filter earth. The volume is about 2000 parts. This alkaline solution can be used direct for further reaction.

2-mercapto-4,6-bis-isopropylamino-s-triazine, however, can also be isolated as described in Example 1. The yield is substantially quantitative. Depending on the rapidity of heating, the melting point of the product is between 250 and 265° (uncorrected).

The following compounds have also been produced by methods corresponding to Examples 1 and 2. As the melting points of the listed mercapto-compounds are generally very high and uncharacteristic, the melting and boiling points of the corresponding herbicidal methylthio-derivatives (thioethers) are given which bear a —SCH$_3$ grouping instead of the —SH group and which are obtained by methylation (e.g. with dimethylsulfate) of the listed mercapto-triazines.

Melting or boiling point of the corresponding methylthioether:

2-mercapto-4-methylamino-6-ethylamino-s-triazine, M.P. 85–89° C.

2-mercapto-4-methylamino-6-isopropylamino-s-triazine, M.P. 81–86° (unmethylated, M. P. 261–263° C.)

2-mercapto-4-methylamino-6-n-propylamino-s-triazine, B.P. 170–174°/0.1 mm.

2-mercapto-4-methylamino-6-allylamino-s-triazine 2-mercapto-4-ethylamino-6-isopropylamino-s-triazine M.P. 90–93° C. (unmethylated, M.P. 268–271°)

2-mercapto-4-ethylamino-6-n-propylamino-s-triazine, M.P. 63–66° C.

2-mercapto-4-ethylamino-6-γ-methoxypropylamino-s-triazine, M.P. 82–84°

2-mercapto-4-n-propylamino-6-isopropylamino-s-triazine, M.P. 74–76°

2-mercapto-4-n-propylamino-6-allylamino-s-triazine, B.P. 157–172°/0.1 mm.

2-mercapto-4-isopropylamino-6-allylamino-s-triazine, B.P. 157–160°/0.1 mm.

2-mercapto-4-isopropylamino-6-γ-methoxypropylamino-s-triazine, M.P. 69–70°

2-mercapto-4,6-bis-allylamino-s-triazine, B.P. 158–164°/0.25 mm. Hg 2-mercapto-4,6-bis-γ-methoxypropylamino-s-triazine, M.P. 59–61°

2-mercapto-4-ethylamino-6-diethylamino-s-triazine 2-mercapto-4-isopropylamino-6-diethylamino-s-triazine, M.P. 90–93°

2-mercapto-4-amino-6-ethylamino-s-triazine, M.P. 118–120°

2-mercapto-4-amino-6-n-propylamino-s-triazine, M.P. 106–107°

2-mercapto-4-amino-6-isopropylamino-s-triazine, M.P. 112.5–115°

2-mercapto-4,6-bis-amino-s-triazine, M.P. of the unmethylated compound, >250°

2-mercapto-4-isopropylamino-6-carboxymethylamino-s-triazine 2-mercapto-4-isopropylamino-6-sec.butylamino-s-triazine, M.P. 104–105°

2-mercapto-4-isopropylamino-6-tert.butylamino-s-triazine, M.P. 147–149°

2-mercapto-4-ethylamino-6-sec.butylamino-s-triazine, M.P. 63–67°

2-mercapto-4-ethylamino-6-tert.butylamino-s-triazine, M.P. 104–105°

2-mercapto-4,6-bis-(sec.butylamino)-s-triazine, M.P. 102–103°

2-mercapto-4,6-bis-(tert.butylamino)-s-triazine, M.P. 173–174°

2-mercapto-4-allylamino-6-γ-methoxypropylamino-s-triazine, B.P. 155–165°/0.007 mm.

2-mercapto-4-allylamino-6-β-methoxyethylamino-s-triazine, B.P. 157–171°/0.01 mm.

What we claim is:

1. In a process for preparing herbicidal derivatives of 2-mercapto-4,6-bis-amino-s-triazine from 2-halogeno-4,6-bis-amino-s-triazines, by replacing the halogen atom by the HS- group and transforming the latter into a herbicidally-active derivative, the improvement consisting essentially of mixing and thereby reacting a 2-halogeno-4,6-bis-amino-s-triazine in an aqueous medium, with thiourea, and saponifying the reaction product in an alkaline medium, thereby obtaining the corresponding 2-mercapto-4,6-bis-amino triazine compound.

2. The improvement described in claim 1 wherein the aqueous medium is water.

3. The improvement described in claim 1 wherein the aqueous medium is a dilute aqueous mineral acid.

4. The improvement described in claim 1 wherein the aqueous medium is a dilute aqueous mineral acid having a strength of 10 to 30% by volume of acid.

5. The improvement described in claim 1, wherein the 2-halogeno-4,6-bis-amino-s-triazine is a 2-chloro-4,6-bis-amino-s-triazine.

6. The improvement described in claim 1, wherein the 2-halogeno-4,6-bis-amino-s-triazine is a compound of the formula

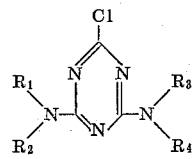

wherein $R_1$ is a member selected from the group consisting of alkyl and alkoxyalkyl, and each of $R_2$, $R_3$ and $R_4$, taken independently of each other, is a member selected from the group consisting of hydrogen, alkyl and alkoxyalkyl.

References Cited in the file of this patent

UNITED STATES PATENTS

| 1,886,480 | Holler et al. | Nov. 8, 1932 |
| 3,043,650 | Wegmann et al. | July 10, 1962 |

FOREIGN PATENTS

| 1,000,821 | Germany | Jan. 7, 1951 |

OTHER REFERENCES

Polonovski et al.: "Bulletin de la Societe Chemique de France," July-August 1950, pp. 616–620.

Boarland et al.: "Journal of the Chemical Society," p. II, 1951, pp. 1218–21.